(12) United States Patent
Blatter et al.

(10) Patent No.: US 6,954,345 B2
(45) Date of Patent: Oct. 11, 2005

(54) GENERATOR FOR PRODUCING HIGH VOLTAGES

(75) Inventors: Richard Blatter, Schaffhausen (CH); Reinhard Joho, Rombach (CH); Sture Lindahl, Vaesteras (SE); Erland Soerensen, Vaesteras (SE)

(73) Assignee: Alstom Technology Ltd., Baden (CH)

( * ) Notice: Subject to any disclaimer, the term of this patent is extended or adjusted under 35 U.S.C. 154(b) by 134 days.

(21) Appl. No.: 10/198,952

(22) Filed: Jul. 22, 2002

(65) Prior Publication Data

US 2003/0020352 A1 Jan. 30, 2003

(30) Foreign Application Priority Data

Jul. 23, 2001 (CH) .............................................. 1365/01

(51) Int. Cl.[7] .............................................. H02H 3/00
(52) U.S. Cl. ........................................ 361/20; 361/62
(58) Field of Search .............................. 361/20, 62, 63, 361/64, 65–69, 117, 118, 119, 127, 128, 35, 38, 21, 23, 39, 40

(56) References Cited

U.S. PATENT DOCUMENTS

| | | | |
|---|---|---|---|
| 4,429,244 A | | 1/1984 | Nikitin et al. |
| 4,604,673 A | * | 8/1986 | Schoendube ................. 361/38 |
| 4,862,307 A | * | 8/1989 | Larson et al. ................. 361/38 |
| 5,206,595 A | * | 4/1993 | Wiggins et al. ............. 324/535 |
| 5,604,423 A | * | 2/1997 | Degeneff et al. ........... 323/258 |
| 6,351,106 B1 | * | 2/2002 | Kramer et al. .............. 323/258 |
| 6,525,504 B1 | * | 2/2003 | Nygren et al. .............. 318/700 |
| 2002/0047439 A1 | * | 4/2002 | Leijon et al. ................ 310/179 |

FOREIGN PATENT DOCUMENTS

| | | |
|---|---|---|
| BE | 422058 | 7/1937 |
| WO | WO97/45926 | 12/1997 |
| WO | WO98/34246 | 8/1998 |
| WO | WO99/17312 | 4/1999 |
| WO | WO99/17427 | 4/1999 |

OTHER PUBLICATIONS

M. Lejion et al, "Breaking Conventions in Electrical Power Plants", No. 11/37–03, CIGRÉ Session 1998).

* cited by examiner

*Primary Examiner*—Brian Sircus
*Assistant Examiner*—Danny Nguyen
(74) *Attorney, Agent, or Firm*—Cermak & Kenealy, LLP; Adam J. Cermak

(57) ABSTRACT

A generator for producing high voltages and having at least one generator winding (12) is connected via a generator circuit (10) to a network (19), which generator circuit has means (15, . . . , 17) for protection against overvoltages. Improved protection against higher voltages is achieved in that the at least one generator winding (12) is subdivided into a number of winding sections (12a–c) whose winding insulation is designed such that the insulation level is graduated, and in that the overvoltage protection means have a number of overvoltage protection elements (15, . . . , 17), which are associated with the respective individual winding sections (12a–c) and whose response levels are matched to the requirements of the associated winding section.

6 Claims, 5 Drawing Sheets

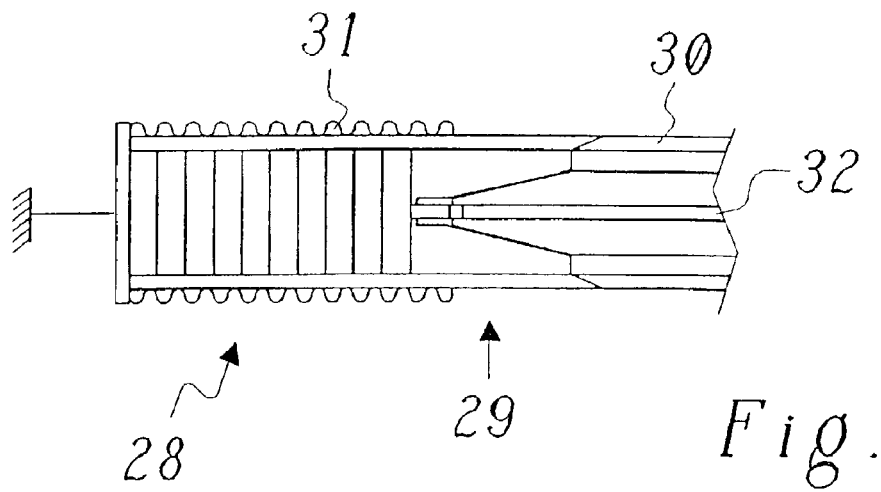
Fig. 3
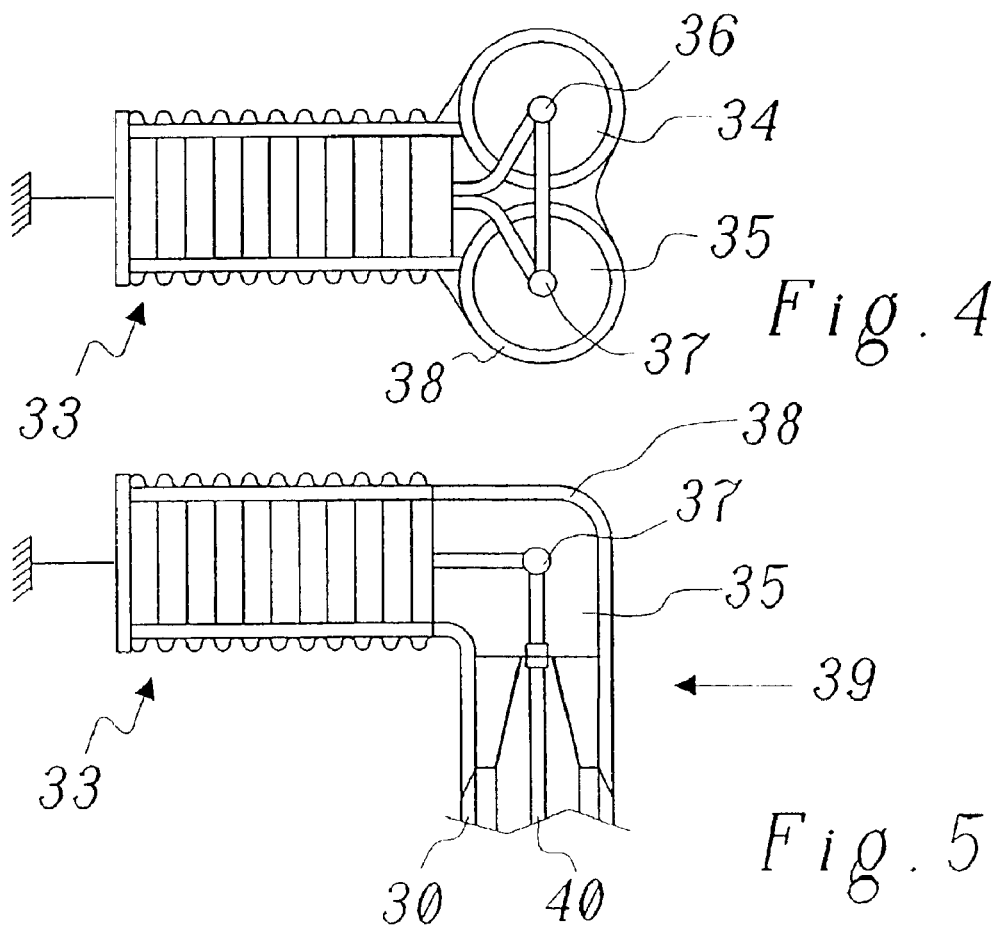
Fig. 4
Fig. 5

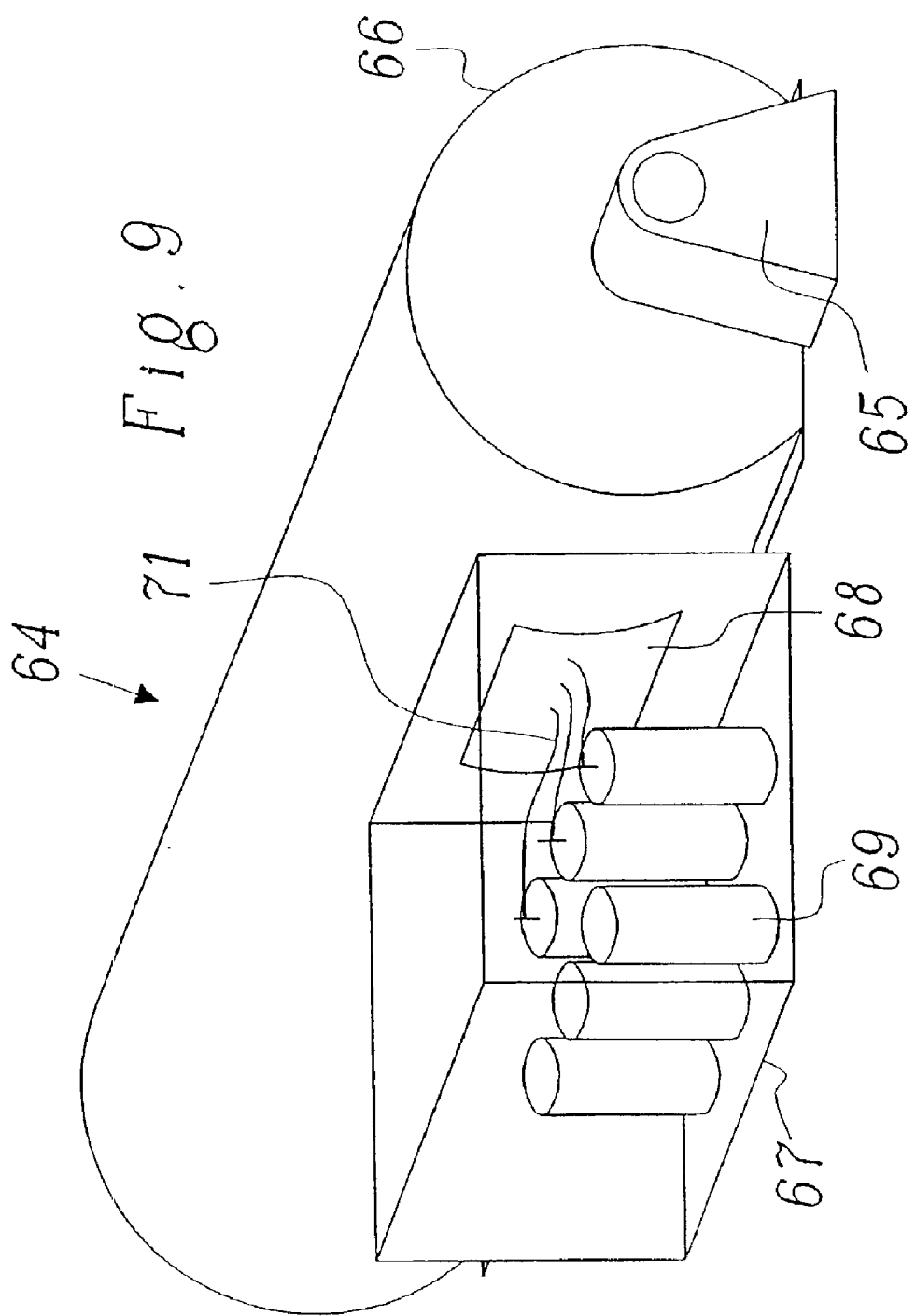

GENERATOR FOR PRODUCING HIGH VOLTAGES

TECHNICAL FIELD

The present invention relates to the field of electricity generation. It relates in particular to a generator for producing high voltages.

PRIOR ART

Protection against external overvoltages in the case of generators is normally provided by means of a set of surge arresters, which are connected to the generator terminals on the phase side. Since the generator winding to be protected has a homogeneous insulation level from the generator terminals to the generator neutral point, this type of overvoltage limiting satisfies the requirements placed on winding insulation.

Generators now exist which produce higher voltages than the normally selected values, and which are in the range from 10 to 25 kV. One example of such a generator is the generator type that has become known by the name "Powerformer", which produces voltages of more than 30 kV and can be connected directly to the network, without any step-up transformer (see, for example, the article by M. Lejion et al., Breaking Conventions in Electrical Power Plants, No. 11/37-03, CIGRÉ (Session 1998)).

In the case of generators such as these, there may be a technical and commercial interest in designing the winding insulation for the generator winding to be graduated, that is to say in selecting it such that there is a reduced isolation voltage at the neutral point end of the winding which is normally connected to the star point. Such graduated winding insulation may, however, in some circumstances lead to an excessive increase in impulse voltages. Impulse voltages such as these are produced by lightning strikes or switching operations in the network and contain frequency components which are considerably above the operating frequency.

DESCRIPTION OF THE INVENTION

The object of the invention is thus to provide a generator which allows the winding insulation for the generator winding to be designed in a graduated manner, with high reliability in terms of overvoltage protection.

An aspect of the invention is that the generator winding is subdivided into a number of winding sections, whose winding insulation is designed such that the isolation voltage is graduated, and that a number of overvoltage protection elements are provided, which are associated with the respective individual winding sections and whose response levels are matched to the requirements of the associated winding section. This ensures optimum overvoltage protection for all the winding sections in a simple manner despite the isolation voltages of the individual winding sections being different.

In this case, first overvoltage protection elements are preferably connected to the junction points between the winding sections, and second overvoltage protection elements are connected to that end of the generator winding which is at high-voltage potential.

According to one preferred embodiment of the invention, the at least one generator winding is subdivided into n (n≧2) winding sections of approximately the same size, n overvoltage protection elements are provided, and the n overvoltage protection elements have an appropriately graduated response level.

According to another preferred embodiment of the invention, a number of generator windings are connected together at a star point which is not grounded, each of the generator windings is subdivided into winding sections, each of the winding sections has an associated matched overvoltage protection element, and a further overvoltage protection element is connected to the star point.

The overvoltage protection elements are preferably in the form of surge arresters, and are connected to the associated winding section via an integrated cable coupling.

Generally, it is expedient for the generator to have a cylindrical housing, and for the overvoltage protection elements to be accommodated in a separate arrester box above the housing.

In the case of low-rating generators, on the other hand, it is simpler for the generator to have a rectangular frame housing, and for the overvoltage protection elements to be combined in an overvoltage protection element module, and to be accommodated in the frame housing.

However, particularly in the case of large generators, it is also feasible for the overvoltage protection elements to be accommodated in a separate fitting, alongside the generator.

BRIEF DESCRIPTION OF THE FIGURES

The invention will be explained in more detail in the following text using exemplary embodiments and in conjunction with the drawing, in which:

FIG. 3 shows an exemplary embodiment of an overvoltage protection element which can be used for the purposes of the invention and is in the form of a surge arrester with an integrated cable end sleeve;

FIG. 4 shows a surge arrester, which is comparable to that shown in FIG. 3, with a double cable connection (shown in the form of a longitudinal section from above);

FIG. 5 shows the surge arrester as shown in FIG. 4, in the form of a longitudinal section from the side;

FIG. 9 shows a perspective view of a generator according to the invention, with an overvoltage protection device accommodated in a separate fitting.

APPROACHES TO IMPLEMENTATION OF THE INVENTION

As already mentioned, the essence of the invention is for the generator winding to be subdivided into individual winding sections whose winding insulation is designed for different voltage levels, and for the generator winding to be protected at the junction points of the sections by means of overvoltage protection elements (for example spark gaps, arresters or the like) such that the response level of these protection elements corresponds to the maximum permissible requirements for the downstream winding section.

Figure 1:
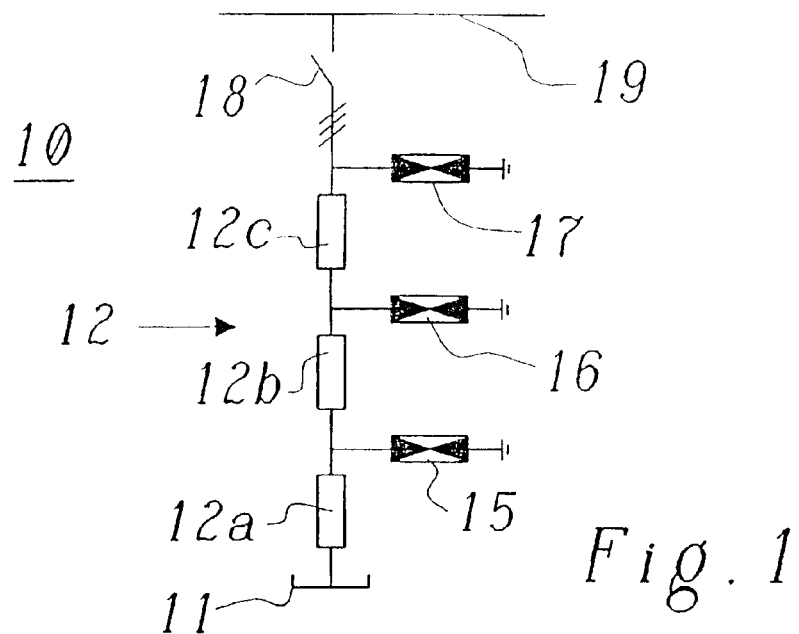
FIG. 1 shows a generator circuit according to a first preferred exemplary embodiment of the invention, in which each grounded generator winding in a three-phase system is subdivided into three winding sections with graduated insulation, and the individual sections are protected by associated overvoltage protection elements.

FIG. 1 illustrates a first exemplary embodiment of such a generator circuit: in the generator circuit 10, each of the generator windings 12 in a three-phase system is connected at one end to a neutral point 11, and can be connected at the other end via a generator switch 18 to a network 19. The generator winding 12 is subdivided into (in this example) three identical winding sections 12a, 12b and 12c, whose winding insulation has a graduated isolation voltage. The network voltage is, for example, 150 kV, while the protection level is 450 kV, overall. Each of the three winding sections 12a–c has its own associated overvoltage protection element 15, 16, 17, whose response level differs within a rising sequence from that of the previous element by in each case ⅓ of the protection level, that is to say by 150 kV. The overvoltage protection element 15 thus has a response level of 150 kV, the overvoltage protection element 16 has a response level of 300 kV, and the overvoltage protection element 17 has a response level of 450 kV. The winding section 12a, which is located in the immediate vicinity of the neutral point 11 and whose insulation is designed for the lowest levels, is thus protected even for voltages above 150 kV while the next-higher, better insulated winding section 12b is protected against voltages above 300 kV, while the final, best-insulated winding section 12c is protected against voltages above 450 kV. In the generalized case of n identical winding sections, the response level of the n overvoltage protection elements rises in sequence, starting from the neutral point, in steps which are 1/n of the overall protection level for the winding.

Figure 2:
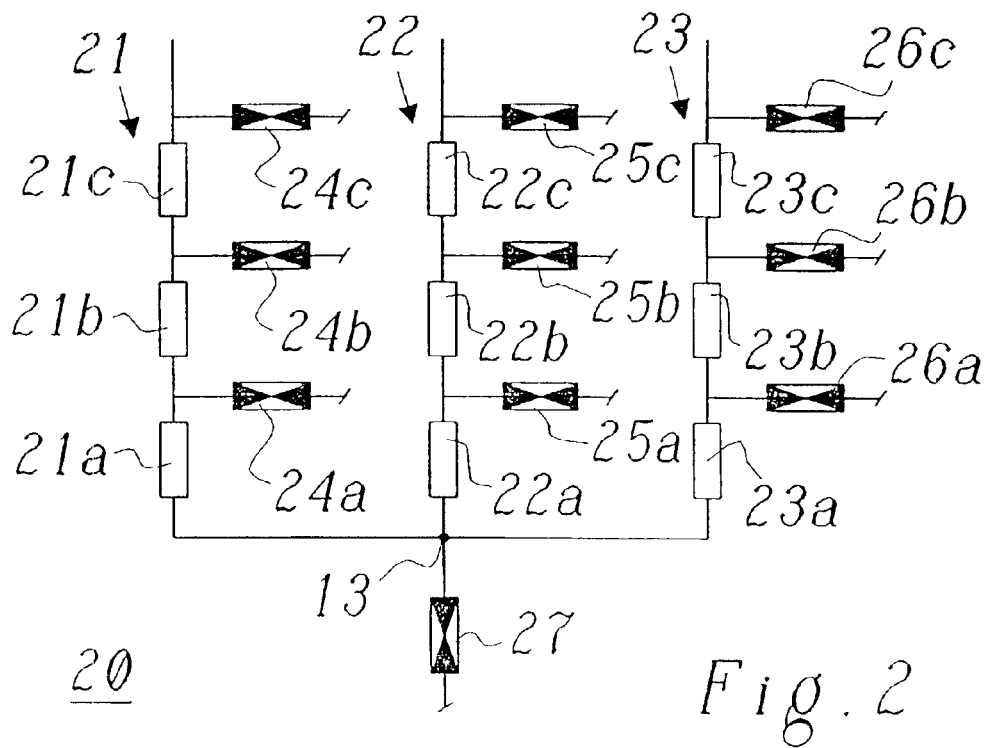
FIG. 2 shows, in an illustration analogous to that in FIG. 1, a generator circuit according to a second preferred exemplary embodiment of the invention, in which three generator windings, which are connected together at a star point which is not grounded, are subdivided into three respective winding sections, and the individual sections are protected by overvoltage protection elements.

FIG. 2 shows a second exemplary embodiment of a generator circuit according to the invention: within this generator circuit 20, three generator windings 21, 22 and 23 are joined together at a common star point 13, which is not grounded. Each of the three generator windings 21, 22 and 23 is subdivided into three identical winding sections 21a–c, 22a–c and 23a–c. In this case as well, each of the winding sections 21a–23c has its own associated overvoltage protection element 24a–c, 25a–c and 26a–c, respectively. In addition, a further overvoltage protection element 27 is connected to the star point. The response levels of the overvoltage protection elements 24a–c, 25a–c and 26a–c, respectively, which are associated with one generator winding, rise in the sequence starting from the star point 13—as in the case of the exemplary embodiment in FIG. 1—in each case in steps of ⅓ (generally: 1/n) of the protection level for the winding overall. The absolute response levels of the individual overvoltage protection elements are, however, greater by a fixed amount, which corresponds to the response level of that overvoltage protection element 27 which is connected to the star point 13.

The overvoltage protection elements which are used in the generator circuits 10, 20 may, as surge arresters, be in the forms shown in FIGS. 3–5, in which, for example, a stack of metal oxide varistors in the form of tablets, is accommodated in an insulating housing. The surge arrester 28 shown in FIG. 3, in which the tablet stack is surrounded by a semiconductive layer 31, has an integrated cable coupling 29, by means of which it can be connected in a simple manner, via a connected cable 30 and by means of an insulated inner conductor 32, to the respective winding section. In the case of the surge arrester 33 shown in FIGS. 4 and 5, two cable connections 34 and 35 are provided, and each have a cable coupling 39, and their inner conductors 36, 37 are connected to the corresponding inner conductors 40 in the connected cables 30'. The cable connections 34, 35 are also provided with an external semiconductive layer 38. The cable couplings 29, 39 and the surge arresters may, in particular, be mounted as individual components, and may be connected together by means of air-insulated connecting elements.

Figure 6:
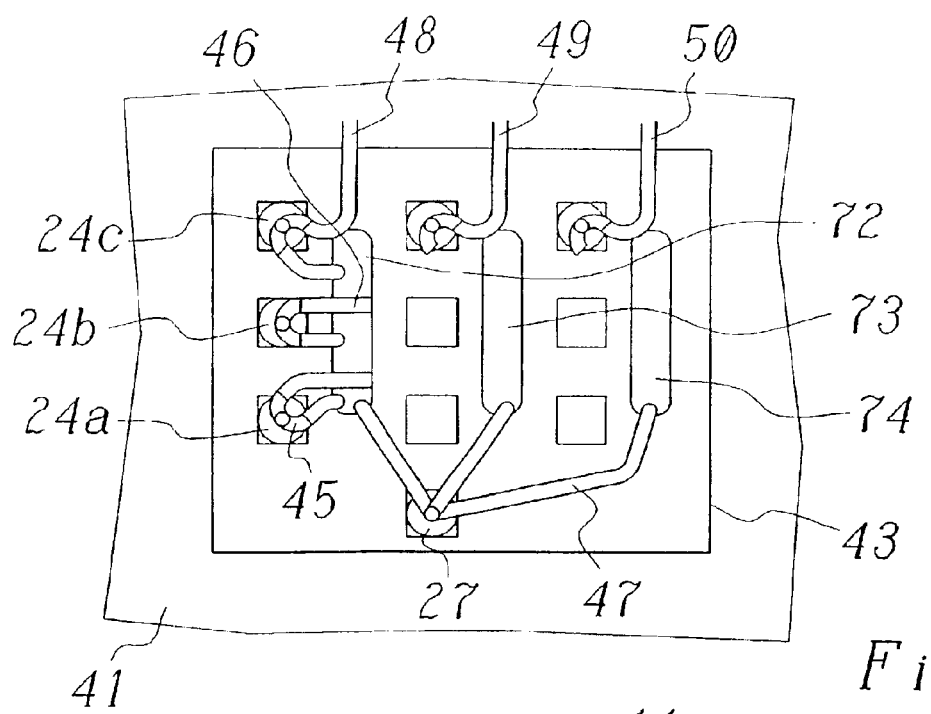
FIG. 6 shows one preferred exemplary embodiment of a generator according to the invention, with an overvoltage protection device fit above the housing (in the form of a plan view from above)
Figure 7:
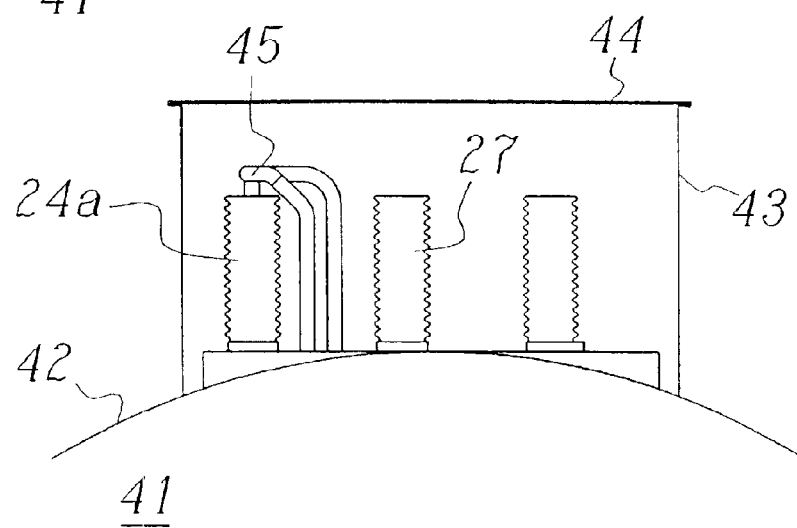
FIG. 7 shows the generator as shown in FIG. 6, looking in the direction of the generator axis.

Overvoltage protection elements such as these with a double cable connection, as is illustrated in FIGS. 4 and 5, are used in the exemplary embodiment of a generator according to the invention as shown in FIGS. 6 and 7. The generator 41 has a cylindrical housing 42. The generator windings are accessible from above, through openings 72, . . . , 74 in the housing 42. An arrester box 43, which can be closed by a cover 44, is arranged at the top on the housing 42, in the region of the openings 72, . . . , 74, and is used to accommodate—as shown in FIG. 2—the overvoltage protection elements 24a–c, 25a–c and 26a–c, as well as the overvoltage protection element 27 which is connected to the star point, vertically. Each of the overvoltage protection elements 24a–26c has a double cable connection with corresponding cable sleeves 45 as shown in FIGS. 4 and 5. The overvoltage protection elements 24a,b, 25a,b and 26a,b are each connected via two cables 46 to adjacent winding sections of the associated generator winding, while the overvoltage protection elements 24c, 25c and 26c are connected firstly to that end of the generator windings which is at high potential and secondly to the generator outgoers 48, 49 and 50 of the generator 41. The other ends of the generator windings are connected to the overvoltage protection element 27, in the form of a star point, via further cables 47. For the sake of simplicity, FIG. 6 illustrates the complete wiring only for the overvoltage protection elements 24a–c and 27, while FIG. 7 illustrates the complete wiring only for the overvoltage protection element 24a.

In a configuration of the generator 42 as shown in FIGS. 6 and 7, it is possible—if the arrester box 43 cannot be installed until it is at the installation location owing to lack of space (transport profile)—for the range of (individually tested) cables 46, 47 may initially be accommodated within the housing 42, such that they are protected during transport.

Figure 8:
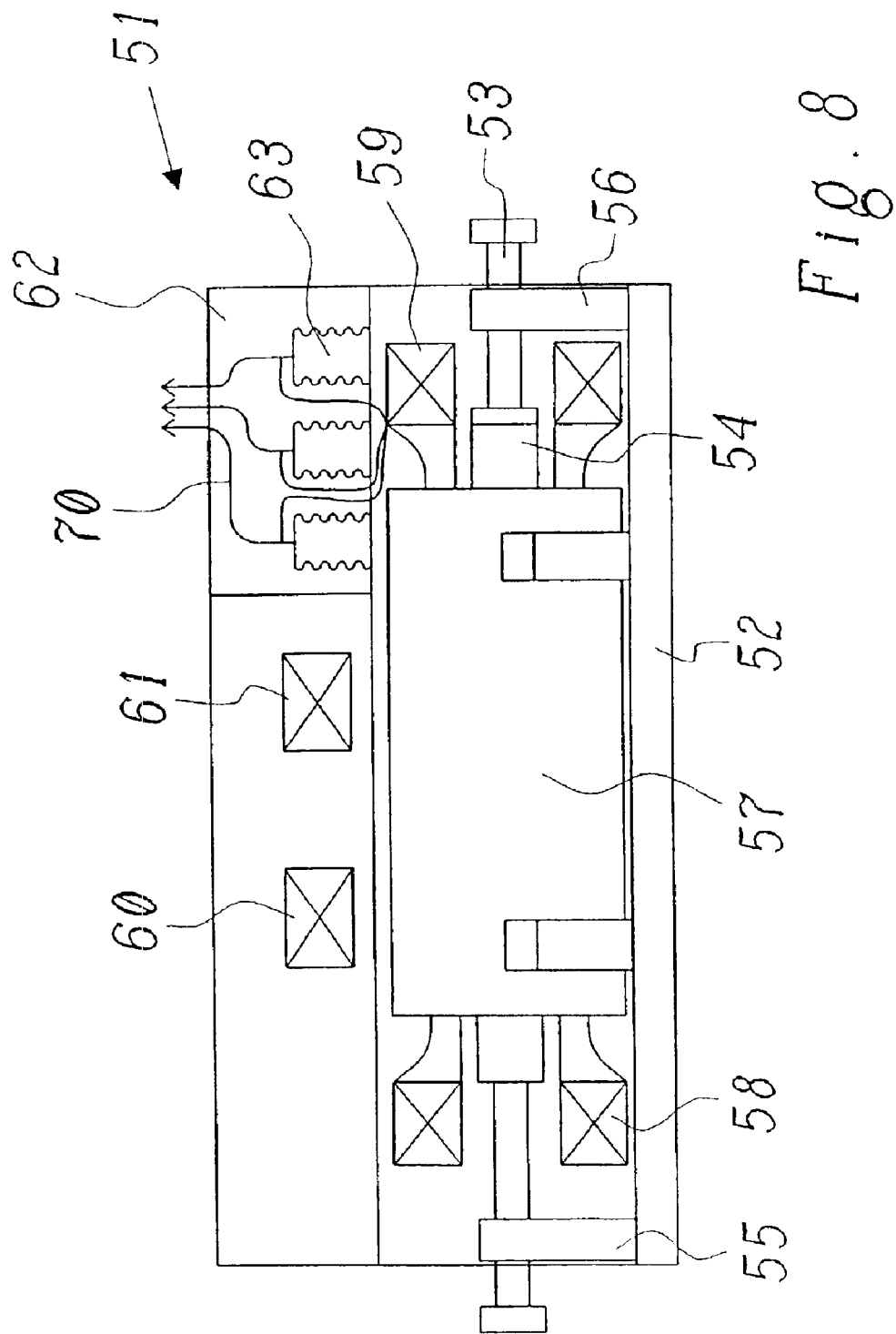
FIG. 8 shows a longitudinal section of a low-rating generator according to the invention, with an overvoltage protection element module integrated in the housing.

FIG. 8 shows a further option for a low-rating generator 51. The generator 51 has, in a manner known per se, a shaft 53 which is mounted in two bearing blocks 55, 56 and is fit with the rotor 54. The rotor 54 is surrounded by a stator 57 with the stator winding, which has two end windings 58, 59. Furthermore, two coolers 60, 61 are provided for cooling. All the parts are accommodated in a compact (rectangular) frame housing 52. In the case of this generator 51, one prewired overvoltage protection element module 62 is provided, which is integrated in the frame housing 52, and its overvoltage protection elements 63 are connected to the stator winding, and to its winding sections, by means of appropriate cables 70 (which are shown schematically in FIG. 8). Such a compact, prewired generator 51 can be transported completely on a low-loader.

Another option for configuration of the generator circuit is illustrated in FIG. 9. In this case, the generator 64 together with the housing 66 and bearing blocks 65 is constructed separately from the overvoltage protection device, whose overvoltage protection elements 69 (which are illustrated in stylized form) are accommodated in their own fitting 67. The overvoltage protection elements 69 are connected to the corresponding winding sections of the generator windings via cables 71 through an opening 68 in the housing 66, in one of the manners illustrated in FIG. 1 or 2.

It is within the scope of the solution according to the invention for a different number of phases also to be used instead of the illustrated three-phase systems.

LIST OF REFERENCE SYMBOLS

10, 20 Generator circuit
11 Neutral point
12 Generator winding
12*a–c* Winding section
13 Star point
14 Double cable connection
15, . . . , 17 Overvoltage protection element
18 Generator switch
19 Network
21 Generator winding
21*a–c* Winding section
22 Generator winding
22*a–c* Winding section
23 Generator winding
23*a–c* Winding section
24*a–c* Overvoltage protection element
25*a–c* Overvoltage protection element
26*a–c*, 27 Overvoltage protection element
28, 33 Overvoltage protection element (surge arrester)
29, 39 Cable coupling
30, 30' Cable
31 Semiconductive layer
32 Inner conductor
34, 35 Cable connection
36, 37, 40 Inner conductor
38 Semiconductive layer
41 Generator
42 Housing (cylindrical)
43 Arrester box
44 Cover
45 Cable sleeve
46, 47 Cable
48, . . . , 50 Generator outgoer
51 Generator
52 Frame housing
53 Shaft
54 Rotor
55, 56 Bearing block
57 Stator
58, 59 End winding
60, 61 Cooler
62 Overvoltage protection element module
63 Overvoltage protection element
64 Generator
65 Bearing block
66 Housing (generator)
67 Fitting
68, 72, . . . , 74 Opening
69 Overvoltage protection element
70, 71 Cable

What is claimed is:

1. A generator for producing high voltages comprising:
   at least one generator winding;
   a generator circuit for connection to a network, the at least one generator winding connected to the generator circuit, the generator circuit having means for protection against overvoltages;
   wherein the at least one generator winding is subdivided into a number of winding sections each having winding insulation such that the insulation level of the at least one generator winding is graduated;
   wherein the overvoltage protection means has a number of overvoltage protection elements each associated with respective individual winding sections and whose response levels are matched to the requirements of the associated winding section;
   wherein the at least one generator winding comprises a plurality of generator windings connected together at a star point which is not grounded, each of the plurality of generator windings being subdivided into winding sections, each of the winding sections matched with an associated overvoltage protection element, and further comprising an overvoltage protection element connected to the star point.

2. A generator for producing high voltages comprising:
   at least one generator winding;
   a generator circuit for connection to a network, the at least one generator winding connected to the generator circuit, the generator circuit having means for protection against overvoltages;
   wherein the at least one generator winding is subdivided into a number of winding sections each having winding insulation such that the insulation level of the at least one generator winding is graduated;
   wherein the overvoltage protection means has a number of overvoltage protection elements each associated with respective individual winding sections and whose response levels are matched to the requirements of the associated winding section;
   wherein the overvoltage protection elements comprise surge arresters each having a cable coupling, the overvoltage protection elements being connected to the associated winding section via the integrated cable coupling.

3. The generator as claimed in claim 2, wherein the overvoltage protection elements which are connected to the junction points between two winding sections have a double cable connection.

4. The generator as claimed in claim 2, further comprising air-insulated connecting elements, and wherein the cable couplings and the surge arresters are mounted as individual components and are connected together by the air-insulated connecting elements.

5. A generator for producing high voltages comprising:
   at least one generator winding;
   a generator circuit for connection to a network, the at least one generator winding connected to the generator circuit, the generator circuit having means for protection against overvoltages;
   wherein the at least one generator winding is subdivided into a number of winding sections each having winding insulation such that the insulation level of the at least one generator winding is graduated;
   wherein the overvoltage protection means has a number of overvoltage protection elements each associated with respective individual winding sections and whose response levels are matched to the requirements of the associated winding section; and
   a cylindrical housing and a separate arrester box above the housing, and wherein the overvoltage protection elements are located in the separate arrester box.

6. A generator for producing high voltages comprising:
   at least one generator winding;
   a generator circuit for connection to a network, the at least one generator winding connected to the generator circuit, the generator circuit having means for protection against overvoltages;

wherein the at least one generator winding is subdivided into a number of winding sections each having winding insulation such that the insulation level of the at least one generator winding is graduated;

wherein the overvoltage protection means has a number of overvoltage protection elements each associated with respective individual winding sections and whose response levels are matched to the requirements of the associated winding section;

a separate fitting alongside the generator, and wherein the overvoltage protection elements are located in the separate fitting.

* * * * *